United States Patent [19]

Hicks

[11] 3,716,402
[45] Feb. 13, 1973

[54] FILM FORMING COMPOSITONS FROM POLYCARBOXYLIC ACIDS AND ADDUCTS OF POLYEPOXIDES AND AMINES

[75] Inventor: Darrell D. Hicks, Jeffersontown, Ky.

[73] Assignee: Celanese Coatings Company, New York, N.Y.

[22] Filed: May 24, 1971

[21] Appl. No.: 146,494

Related U.S. Application Data

[63] Continuation-in-part of Ser. No. 806,727, March 12, 1969, abandoned.

[52] U.S. Cl........117/161 LN, 117/124, 117/132 BE, 117/132 BF, 117/138.8 A, 117/148, 117/161 P, 117/161 UT, 117/161 ZB
[51] Int. Cl.............................C09d 3/58, B44d 1/36
[58] Field of Search ...117/132 BE, 161 UT, 161 LN, 117/124, 132 BF, 138.8 A, 148, 161 P, 161 ZB; 260/47 EC, 2 EC, 834

[56] References Cited

UNITED STATES PATENTS

| | | | |
|---|---|---|---|
| 3,301,795 | 1/1967 | Wooster | 260/2 |
| 3,288,881 | 11/1966 | Lee | 260/47 X |
| 3,367,991 | 2/1968 | Hicks | 260/834 |
| 3,410,926 | 11/1968 | Hicks | 260/834 |
| 2,637,716 | 5/1953 | Ott | 260/834 X |
| 2,900,364 | 8/1959 | Wasserman | 260/47 |
| 2,868,767 | 1/1959 | Cyba et al. | 260/47 |
| 3,444,132 | 5/1969 | Noeske et al. | 260/2 X |

Primary Examiner—William D. Martin
Assistant Examiner—Harry J. Gwinnell
Attorney—Thomas J. Morgan, H. P. Price and W. E. Maycock

[57] ABSTRACT

A curable coating composition having utility when applied as a film to a substrate from an aqueous solution is prepared from a mixture of (1) the reaction product of a polyfunctional epoxide compound and a primary amine with (2) a polycarboxylic acid or acid anhydride and, in some cases (3) an aminoplast resin.

11 Claims, No Drawings

FILM FORMING COMPOSITONS FROM POLYCARBOXYLIC ACIDS AND ADDUCTS OF POLYEPOXIDES AND AMINES

This application is a Continuation-in-Part of application Ser. No. 806,722, filed Mar. 12, 1969, now abandoned.

BACKGROUND OF THE INVENTION

The field of art to which this invention pertains is mixed synthetic resins made from polyepoxide components, amines and polycarboxylic acids. In another aspect this invention relates to water solutions of these resins and to cured products obtained therefrom.

Curing of epoxy resins with aliphatic and aromatic amines is well known in the art as is the curing of epoxy-amine adducts with aminoplast resins. In U.S. Pat. No. 3,367,991 thermoplastic addition products of amines and polyepoxide resins are cured by reaction with amine aldehyde resins. But epoxy-amine adducts have not until now been cured with polycarboxylic acids. Neither have these adducts been shown to be water soluble when salted with a polycarboxylic acid. In the conventional epoxy resin-amine curing reaction, curing takes place as a crosslinking reaction between epoxy groups and amino groups. In the composition of the invention now disclosed all epoxy groups are first completely reacted with a primary amine to form an ungelled epoxy-amine adduct with curing being effected by the reaction of this epoxy-amine adduct with a polycarboxylic acid or acid anhydride to form ester and amide groups. Thus this invention offers an improvement over previous epoxy-amine systems in that no unreacted epoxy groups that could cause solution instability are present. A second advantage offered by the compositions claimed in this invention is that, while an aminoplast resin is not necessary to produce a cured film, it may be employed where films of high flexibility and hardness are required. Previously in the art epoxy resins have been cured by the use of amines or carboxylic acids and anhydrides. But these resins tend to be somewhat brittle and exhibit low flexibility. By using an aminoplast resin with the composition of this invention, films can be obtained which exhibit improvements in flexibility and hardness over films produced from amine or carboxylic acid cured epoxy resins.

An additional improvement offered by this invention is that the resinous compositions are soluble in either water or organic solvents. Water solutions of this new composition offer several advantages over conventional organic solvent solutions. Included are reduced flammability, reduced cost, reduced toxicity, and ready availability of water. Finally, although previous disclosures in the literature have taught the solubilization of epoxy based resins, low solution solids have been required to give adequate handling characteristics. By the methods of this invention, a water solution may be prepared which is quite readily handled at 40–60 solids or higher.

The solids content of the aqueous solutions prepared in accordance with this invention can vary from about 10 to about 80 percent by weight. In general, solids contents of about 10 weight percent are employed in electrodeposition applications. However, such low levels often are not practical for various other applications. Thus the preferred range of solids content of the present invention is from about 30 to about 80 weight percent. The most preferred range is from about 40 to about 60 weight percent.

Thus by the invention now disclosed, a resin may be prepared which is applicable at high solids, soluble in either water or organic solvents, stable at room temperature and curable with or without the aid of an aminoplast crosslinking agent.

SUMMARY OF THE INVENTION

By this invention a curable composition is formed by the mixing of (1) the reaction product of a polyepoxide and the primary amine, (2) a polycarboxylic acid or acid anhydride and in some cases (3) an aminoplast resin and acidic catalyst. This resulting mixture is both organic solvent and water soluble and can be applied on any desirable substrate. The polyepoxide resin and the primary amine are reacted in the ratio of about 1 mol of amine for each epoxide equivalent of the polyepoxide resin to form an ungelled polyepoxide-amine adduct containing no unreacted epoxide groups. The adduct and the polycarboxylic acid or acid anhydride are present in the equivalent ratio of about 1:1 to 1:2, the equivalents being based on amino nitrogen atoms and carboxylic acid equivalents. The aminoplast resin can be added to the composition in the amounts of 10 to 40 percent by weight based on the total weight of the composition and an acidic catalyst can be used in the amount of 1 to 2 percent by weight based on the total weight of the composition.

DESCRIPTION OF THE INVENTION

Epoxy molecules represented by the general formula

react quite readily with primary amines. This reaction can be accelerated by elevating the temperature of the reactants:

1. 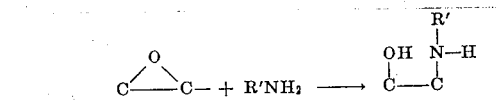

Thus if the epoxy resin contains more than one vicinal epoxide group per molecule a polyamine is formed when an equivalent amount of amine is added and reacted with each epoxide group. As is shown above the reaction between an epoxide group and a primary amine yields a moiety with at least one active amine hydrogen and one unreacted hydroxyl group. These resulting functional groups can be reacted further with an organic acid or anhydride to produce cured films. The amine secondary hydrogen will react in the following manner to produce an amide:

2. With an organic acid

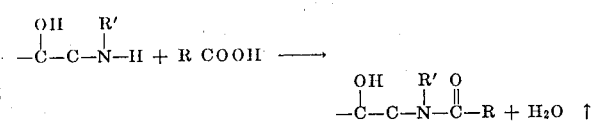

3. With an organic anhydride

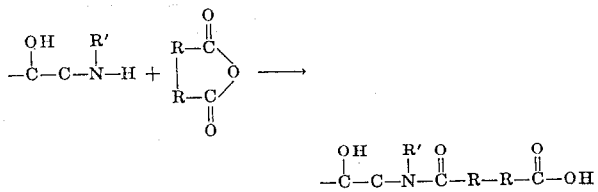

It should be noted that reaction No. 3 will proceed equally as well with anhydrides which are not cyclic.

Similarly the unreacted hydroxyl groups formed by the condensation of an epoxy molecule and a primary amine will react further with an organic acid or anhydride to produce an ester:

4.

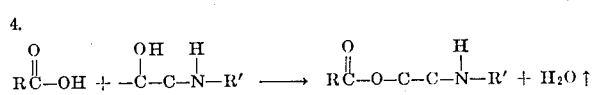

Thus the polyamine formed by the reaction of epoxy and primary amino groups can be further reacted and eventually cured through the reaction of the resulting hydroxyl and secondary amine groups with polycarboxylic acid groups. Further cure can also be attained by the reaction of an aminoplast resin with unreacted carboxyl or hydroxyl groups.

One of the most desirable features of the composition of this invention is its water solubility. Normally, water soluble resins are produced by one of two basic methods. In the first method a water soluble polymer is formed which with no further modification is water soluble, e.g., polyethylene glycol or polyacrylamide. The most common method, however, has been the formation of a water soluble amine salt from a polymer containing large amounts of unreacted carboxylic acid groups. The invention disclosed herein shows a third and quite unique method for attaining water solubility. Instead of using a polymeric acid and a low molecular weight amine, a polymeric amine and low molecular weight acid are used to produce a water soluble salt:

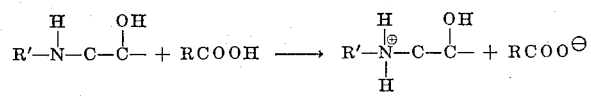

This method offers several improvements over the prior art. When water soluble polymers such as polyacrylamide are used as coatings, the water resistance of the film is quite poor due to the water solubility of the polymer itself. On the other hand the composition of the invention now disclosed completely looses its water solubility upon cure since a large portion of the amine salts is converted into amide. When water soluble resins formed from high acid containing polymers are cured, the highly volatile amine used to form its acid salt evaporates leaving behind unneutralized acid which is quite susceptible to attack from alkali. But the polymers now disclosed do not exhibit this problem. When they are cured the majority of the acid groups present react to form amides and esters thus greatly decreasing the cured film's susceptibility to alkaline attack.

Thus the chemical steps for preparing this invention can be listed as follows:

1. Polyamine formation by the reaction of a primary amine with a polyepoxide molecule.
2. Water soluble salt formation by adding a polycarboxylic acid or acid anhydride to the above formed polyepoxide amine adduct.
3. Amide and ester formation by heating the above salt.

The polyepoxide resins referred to in this invention are molecules or resins having more than one vicinal or 1,2 epoxide group. Preferred epoxy resins used in the compositions of this invention are polyglycidyl ethers of polyhydric phenols obtained by reacting a polyhydric phenol in an excess of epichlorohydrin with sodium hydroxide. Such polyhydric phenols include p,p'-dihydroxydiphenyl propane (Bisphenol A), resorcinol, hydroquinone, 4,4'-dihydroxybenzophenone, bis(4-hydroxyphenyl) ethane, 1,5-dihydroxynaphthalene, 4,4'dihydroxybiphenyl, novolak resins containing more than 2 phenol moieties linked through methylene bridges, and the like.

Other epoxide resins are those prepared by reacting 1.2 up to about 2 mols of epichlorohydrin with 1 mol of a dihydric phenol or by reacting diepoxides with added dihydric phenol.

The epoxide resins also include polyglycidyl ethers of polyhydric alcohols, made by reacting a polyhydric alcohol with epichlorohydrin and an acidic catalyst such as boron trifluoride, and subsequently treating the resulting product with an alkaline material. Included along the polyhydric alcohols that can be used in the preparation of these epoxide resins are glycerine, ethylene glycol, propylene glycol, diethylene glycol, hexanetriol, pentaerythritol, trimethylol ethane, trimethylol propane, etc. In addition, polyhydric ether alcohols, for instance diglycerol, dipentaerythritol, polyalkylene glycols and hydroxyalkyl ethers of the aforementioned polyhydric phenols can be used.

Also included in the definition of epoxide resins are glycidyl esters of polycarboxylic acids, such acids being azelaic acid, dimerized and trimerized unsaturated fatty acids, hexahydro phthalic acid, phthalic acid, and the like.

Still other epoxide resins are epoxidized hydrocarbons, such as vinyl cyclohexene dioxide, butadiene dioxide, dicyclopentadiene dioxide, epoxidized polybutadiene and limonene dioxide. Other epoxy resins are epoxidized esters, for example epoxidized unsaturated vegetable oils, epoxidized soybean oil, epoxidized glycerol trilinoleate and 3,4-epoxy-6-methylcyclohexylmethyl-3,4-epoxy-6-methylcyclohexanecarboxylate.

Still other epoxide resins are polymers and copolymers of vinyl polymerizable monoepoxides, such monoepoxides being allyl glycidyl ether, glycidyl acrylate and glycidyl methacrylate.

Epoxide resins useful in this invention are described in Epoxy Resins by Lee and Neville, McGraw-Hill Book Company, 1957.

The preferred epoxy resins used in this invention are those having a molecular weight of less than about 1,000 with the most preferred epoxy resin being the diglycidyl ether of p,p'dihydroxy diphenyl propane having a weight per epoxide of about 180 to about 250.

A primary amine as defined in this invention includes ammonia or aqueous ammonia, and aliphatic, aromatic, and cycloaliphatic amine molecules having one hydrocarbon substituent containing from one to about eight atoms. Such amines include methylamine, ethylamine, isopropylamine, butylamine, amylamine, hexylamine, aniline, cyclohexylamine, heptylamine, 2-ethylhexylamine, allylamine, aniline, and benzylamine.

Very useful monoprimary amines are hydroxyl containing primary amines, that is amines which contain at least one hydroxyl group. The particularly preferred hydroxy amines are primary amines which contain one nitrogen atom having one hydroxyl substituted hydrocarbon substituent and two hydrogen atom substituents, the hydrocarbon substituent containing one to about three hydroxyl groups and from two to about six carbon atoms. Examples of such amines are ethanol amine, isopropanol amine, 3-amino-propane - 1,2-diol, 2-amino - propane - 1,3-diol, 4-amino-butane-1,2-diol, 2-amino-2-methyl-propane-1,3-diol, tris(hydroxymethyl)-amino-methane and 2-amino-2-ethyl-propane-1,3-diol. Of the above mentioned amines the preferred are those hydroxy containing amines which are water soluble, with monoethanol amine being the most preferred.

When an amine and an epoxy resin are selected from the above lists to be co-reacted, the best results are attained when about one mol of the selected amine is present for each epoxide equivalent of the epoxy resin. However, a small excess of amine also will produce acceptable results.

Polycarboxylic acids as utilized in this invention include both anhydrides and acids which have from 2 to 4 carboxyl groups per molecule. An anhydride is considered as having 2 carboxyl groups. In general, the suitable polycarboxylic acids or anhydrides are the aliphatic polycarboxylic acids or anhydrides having from two to about 10 carbon atoms, the aromatic polycarboxylic acids or anhydrides having from eight to about 20 carbon atoms, the cycloaliphatic polycarboxylic acids having from eight to about 20 carbon atoms, and dimerized and trimerized fatty acids. Among others the following are effective in producing the compositions of this invention: fumaric acid, maleic acid and anhydride, succinic acid and anhydride, adipic acid, oxalic acid, azelaic acid, sebacic acid, hexahydrophthalic acid and anhydride, dimerized and trimerized fatty acids, phthalic acid and anhydride, 4-nonylphthalic acid and anhydride, isophthalic acid, 5-dodecylisophthalic acid, terephthalic acid, naphthalene-1,3-dicarboxylic acid, trimellitic acid and anhydride, pyromellitic anhydride and anhydride, pyromellitic anhydride and acid, chlorinated acids and anhydrides and the like.

The preferred acids used in this invention have been found to be adipic and sebacic. However, satisfactory results have also been attained when small amounts of adipic or sebacic acids are replaced with dimerized fatty acids. Well cured films result when from 1 to 2 equivalents of the preferred acid are added to each mol of amine nitrogen atom present in the preformed polyepoxide-amine adduct. However, the preferred acid concentration is about 1 equivalent of acid for each mol of amine nitrogen in the preformed polyepoxide-amine adduct.

When employed in this invention aminoplast resins can be present in amount of about 10 to about 40 percent by weight of the total composition. Included among the aminoplast resins which can be employed in this invention are alkoxylated methylolmel-amines, urea formaldehyde and benzoguanamine type resins. Water soluble aminoplasts are preferable in water based solutions, while in organic solvent solutions, the water solubility of the aminoplast resin is of no consequence. The preferred aminoplast resins are the reaction products of formaldehyde with melamine and benzoguanamine further etherified with methanol. Preferred amounts of aminoplast resins are from about 15 to about 25 weight percent of the total composition. In addition a small amount (1.0 to 2.0 weight percent based on the total weight of the composition) of an acid catalyst, preferably the morpholine salt of para-toluene sulfonic acid, can be used to increase the cure response of the compositions of this invention when aminoplast resins are used.

The degree of water solubility of polymers formed by this invention is to a large extent determined by the molecular weight of the preformed polyepoxide-amine adduct. Also controlling in determining the extent of water solubility of the final product is the degree of initial water solubility exhibited by the amine which is chosen. In most cases the resulting polymers are not completely water soluble and require the addition of up to about 80 percent of a water soluble oxygenated solvent to effect complete solubilization. Such solvents can be selected from water soluble alcohols, polyols, and ether alcohols including the mono ethyl ether of ethylene glycol (Cellosolve), the monobutylether of ethylene glycol (butyl Cellosolve), and other ethylene and propylene glycol ethers, diethylene glycol monoethers, polyethylene and propylene glycol ethers, ethanol, propanol, isopropanol, butanol, tertiary butanol, ethylene glycol, propylene glycol, and the like. The amount of co-solvent to be used depends upon the degree of solubility shown by the particular composition, with the less water soluble compositions requiring more co-solvent. Some resins require as much as 80 percent co-solvent while others require none at all. In most instances however, just enough co-solvent is added to impart water solubility.

The compositions of this invention can also be solubilized in a number of various organic solvents. The choice of solvents depends on the particular end use and the solubility parameters of the polymer involved. Better solubility and lower viscosities are attained by the use of polar solvents such as the above mentioned co-solvents. Generally, however, solvents can be selected from the following group: xylene, toluene, benzene, oxygenated solvents, aliphatic organic solvents, phenols, cresols, petroleum based solvents and so forth. In addition, any solvent selected should be liquid at room temperature (25° C.) and have a boiling point of less than 350° C. The preferred boiling point range is about 100° C. to about 250° C.

A solvent or water solution of the compositions of this invention can be applied by any one of the standard coating application methods, e.g., dip coating, spraying, brushing, etc. The compositions can also be applied by electrodeposition. However, instead of producing a film at the anode as is the case with conventional electro-coating resins, polymers of the type disclosed in this invention are deposited at the cathode.

This property can be put to use in preparing acid free electrodeposition resins.

Curing of a film applied by any of the above methods is accomplished by baking at from about 75° C. to about 350° C. with the preferable temperature range being about 150° to 200° C. Films can be applied to any substrate including glass, wood, metal or plastic. The resulting cured films exhibit unique adhesion, toughness and resistance to attack by boiling water or alkali.

Preparation of the composition of this invention is carried out by pre-reacting a polyepoxide and a primary amine at about 50° C. to about 250° C. until all the available epoxide rings are opened. However, the preferable temperature range is 110° C. to 150° C. This is usually accomplished by adding a polyepoxide to the selected primary amine over a 1-4 hour period and then holding the resulting mixture at reaction temperature for an additional 1-3 hours. When the reaction is complete, the resulting product is cooled to room temperature and the specified amount of polybasic acid is added along with a small amount of water and/or oxygenated solvent. This mixture can then be reacted at from about 20° C. to about 150° C. until a clear solution is attained. Preferably, however, only slight warming is needed to produce a clear solution. A solution prepared in the above manner can easily be handled at room temperature by the addition of an additional 10-20 weight percent of water or co-solvents or mixtures thereof.

The composition of this invention can easily be pigmented with standard pigments. However, the most useful area of application has been found to be as a primer. Pigmentation can be selected from the following: titanium dioxide, lampblack, iron oxide, barytes talc, lead strontium chromate and other similar pigments. Preparation of the pigmented composition is accomplished by grinding a mixture of the resin, solvent and pigment on a steel ball grinder for about 30 minutes, or on a pebble mill for 8-24 hours. The preferable pigment to binder ratio is about 1:1. Baking of the resulting pigmented resins produces films which are quite hard and adhesive.

DESCRIPTION OF THE PREFERRED EMBODIMENTS

This invention is further described but not limited by the following specific examples. Parts, as expressed in these examples, is understood to mean parts by weight. Several of the compounds used in this invention are described as follows:

Epoxide A — the diglycidyl ether of p,p' dihydroxydiphenyl propane having a weight per epoxide of about 190.

Epoxide B — 3,4 - epoxy cyclohexylmethyl-3,4 epoxy cyclohexane carboxylate.

Epoxide C — an epoxidized vegetable oil containing about 9 percent oxirane oxygen and having about 5 epoxide groups per molecule of oil.

EXAMPLE 1

To a suitable reaction flask equipped with a thermometer, mechanical agitator and condenser, 48.8 parts of mono ethanol amine were added. Heat was applied until a temperature of 76° C. was attained, at which time a 3 hour addition of 151.2 parts of Epoxy A was begun. After this addition was completed, the reaction temperature was increased to 130° C. over a period of 4 hours. The resulting reaction product was extremely viscous and exhibited a light amber color. 71 parts of this reaction product were then added to 29 parts of sebacic acid and 50 parts of water and heated until a clear solution was obtained. 25 parts of water and 25 parts of butyl Cellosolve were added to the above clear solution yielding a solution which was at 50 percent solids and had a Gardner-Holdt viscosity of L at 25° C.

EXAMPLE 2

Using the same procedure as in Example 1, 56.8 parts of the above reaction product of Epoxy A and mono ethanol amine were prepared by adding Epoxy A to the mono ethanol amine over a 1 hour period. To this product 23.2 parts of sebacic acid were added along with 50 parts of water. This resulting mixture was heated until clear and 20 parts of hexamethoxy methylmelamine were added along with 25 parts of water, 25 parts of butyl Cellosolve, and 1.5 parts of the morpholine salt of para toluene sulfonic acid. This yielded a solution which was at 50 percent non-volatile and had a Gardner-Holdt viscosity of E-F.

EXAMPLE 3

Using the same procedure as in Example 1, 108.8 parts of n-butyl amine were reacted with 291.2 parts of Epoxy A. 39.3 parts of this resulting reaction product were then warmed with 10.7 parts of adipic acid, 20 parts of water and 20 parts of the mono methyl ether of propylene glycol. The addition of 5 parts of water and 15 parts of the mono methyl ether of propylene glycol produced a clear solution which when applied to a steel substrate and baked for 30 minutes at 180° C. exhibited excellent film properties.

EXAMPLES 4 THROUGH 6

In a similar manner the following examples were prepared:

| Example | Epoxide | Parts | Mono ethanol amine, parts | Adipic acid, parts | Water, parts | Butyl cellosolve, parts |
|---|---|---|---|---|---|---|
| 4 | A | 76.1 | 23.9 | 57.0 | 133.4 | 23.6 |
| 5 | B | 69.6 | 30.4 | 72.5 | 42.7 | 86.8 |
| 6 | C | 74.4 | 25.6 | 61.5 | 39.9 | 80.6 |

EXAMPLE 7

28.2 parts of a solution of the polyamine-acid adduct of Example 4 was prepared. This solution was added to a suitable steel ball containing shaker along with 48.0 parts of water, 12.0 parts of butyl Cellosolve, 0.63 part of carbon black, 1.91 parts of lead silica chromate, 0.96 part of strontium chromate and 28.30 parts of titanium dioxide. After this mixture was shaken for 30 minutes, films were cast on steel panels and baked for 30 minutes at 180° C. Cured films resulted which had excellent flow, mar resistance, adhesion and toughness.

Similar pigment solutions of the compositions of Examples 2, 5 and 6 were prepared and films were also cast on steel panels. Baking for 30 minutes at 180° C.

produced cured coatings which had excellent film properties.

EXAMPLE 8

Employing the same procedure as in Example 1, 200 grams of the polyamine-acid adduct solution of Example 1 were prepared. This solution was added to a suitable steel ball containing shaker along with 25 parts of water, 8.3 parts of butyl Cellosolve, 25 parts of iron oxide, 60 parts of barytes, 10 parts of talc and 5 parts of lead silica chromate. After shaking for 30 minutes, films were cast on steel panels and baked for 20 minutes at 177° C. The resulting films exhibited excellent cure and surface properties, had about a 1.5 mil film thickness, passed an 80 in. lb. Gardner reverse impact and were unaffected after one hour's submersion in boiling water.

It is understood that the foregoing detailed description is given by way of illustration only and that many variations may be made without departing from the spirit of this invention.

The embodiments of the invention in which an exclusive property or privilege is claimed are defined as follows:

1. A process for obtaining a cured coating on a substrate, which comprises the steps of:
    a. Mixing a polyepoxide-amine adduct which is free of unreacted epoxide groups with a polycarboxylic acid or acid anhydride,
    b. dissolving the mixture obtained in a. in a solvent,
    c. coating a substrate with the solution obtained in b., and
    d. curing the coating obtained in c. by heating at from about 75° to about 350° centigrade, wherein,
        1. said polyepoxide-amine adduct is the product of either ammonia or a primary amine, and a polyepoxide, reacted at a temperature in the range of from about 50° to about 250° centigrade, wherein,
            a. said primary amine is aliphatic cycloaliphatic, or aromatic, and contains a single nitrogen atom and from one to about eight carbon atoms,
            b. said polyepoxide contains more than one 1,2-epoxide group, and is selected from the group consisting of polyglycidyl ethers of polyhydric phenols, polyglycidyl ethers of polyhydric alcohols, glycidyl esters of polycarboxylic acids, epoxidized hydrocarbons and esters, and polymers and copolymers of vinyl polymerizable monoepoxides, and
            c. the amount of said ammonia or primary amine employed is about 1 mol per 1,2-epoxide group of said polyepoxide,
        2. said polycarboxylic acid or acid anhydride is selected from the group consisting of aliphatic polycarboxylic acids and anhydrides having from two to about 10 carbon atoms, aromatic polycarboxylic acids and anhydrides having from eight to about 20 carbon atoms, cycloaliphatic polycarboxylic acids and anhydrides having from eight to about 20 carbon atoms, and dimerized and trimerized fatty acids.
        3. The ratio of the number of nitrogen atoms in said polyepoxide-amine adduct to the number of carboxylic acid equivalents in said polycarboxylic acid anhydride is in the range of from about 1:1 to about 1:2,
        4. said solvent consists of from about 20 to 100 weight percent water and up to about 80 weight percent of a co-solvent selected from the group consisting of the water-soluble aliphatic organic solvents and polyols and monoethers thereof, and
        5. the amount of said solvent employed is sufficient to provide a solution containing from about 10 to about 80 weight percent of solids, based on the total weight of the solution.

2. The process of claim 1 wherein the mixture obtained in step a. contains from about 10 to about 40 weight percent, based on the total weight of said mixture, of an aminoplast resin selected from the group consisting of the urea-formaldehyde resins, the melamine-formaldehyde and alkylated melamine-formaldehyde resins, and the benzoguanamine-formaldehyde and alkylated benzoguanamine-formaldehyde resins.

3. The process of claim 2 wherein said mixture also contains from about 1 to about 2 weight percent, based on the total weight of said mixture, of the morpholine salt of p-toluenesulfonic acid.

4. The process of claim 1 wherein said primary amine is n-butylamine.

5. The process of claim 1 wherein said primary amine is a hydroxy-substituted amine having from 1 to 3 hydroxy groups and from 2 to about 6 carbon atoms.

6. The process of claim 5 wherein said primary amine is isopropanol amine.

7. The process of claim 5 wherein said polyepoxide is a diglycidyl ether of p,p'-dihydroxydiphenyl propane having a weight per epoxide of from about 180 to about 250, said primary amine is ethanol amine, and said polycarboxylic acid is adipic acid.

8. The process of claim 5 wherein said polyepoxide is a diglycidyl ether of p,p'-dihydroxydiphenyl propane having a weight per epoxide of from about 180 to about 250, said primary amine is ethanol amine, said polycarboxylic acid is sebacic acid, said co-solvent is the monobutyl ether of ethylene glycol, and said mixture contains from about 15 to about 25 weight percent, based on the total weight of the mixture, of hexamethoxy methyl melamine.

9. The process of claim 5 wherein the solids content is in the range of from about 30 to about 80 weight percent.

10. The process of claim 5 wherein the solids content is in the range of from about 40 to about 60 weight percent.

11. The process of claim 8 wherein said mixture also contains from about 1 to about 2 weight percent, based on the total weight of the mixture, of the morpholine salt of p-toluenesulfonic acid.

* * * * *